Aug. 18, 1959 P. E. BESSIERÉ 2,900,594
SYSTEMS INCLUDING SLIPPING COUPLING MEANS BETWEEN
A DRIVING SHAFT AND A DRIVEN SHAFT FOR GENERATORS
Filed Feb. 12, 1957 2 Sheets-Sheet 1
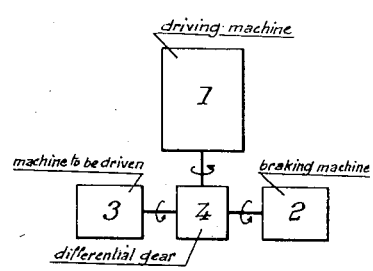
*Fig. 1.*
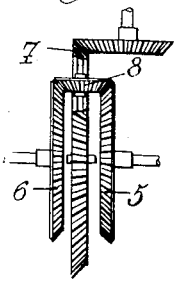
*Fig. 2.*
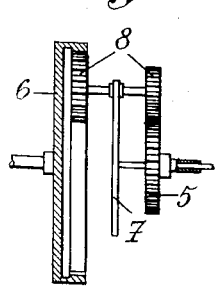
*Fig. 3.*
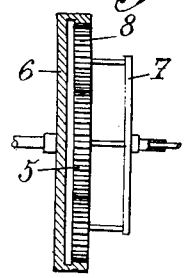
*Fig. 4.*
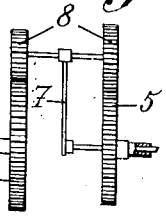
*Fig. 5.*
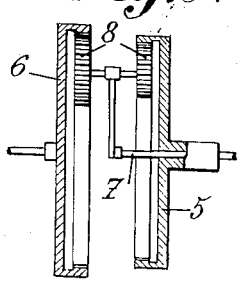
*Fig. 6.*
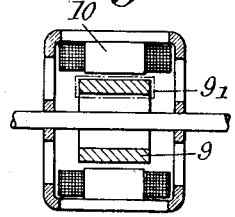
*Fig. 7.*
*Fig. 8.*
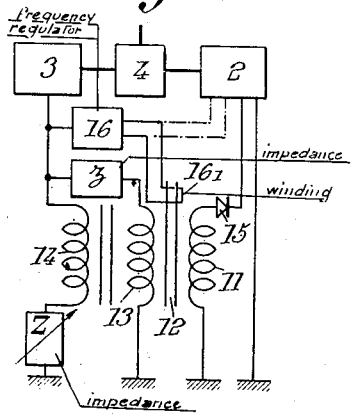
*Fig. 9.*
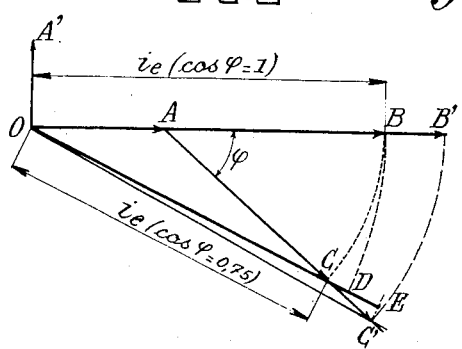
*Fig. 10.*
INVENTOR
Pierre E. Bessiere
BY
Bailey, Stephens & Huettig
ATTORNEYS

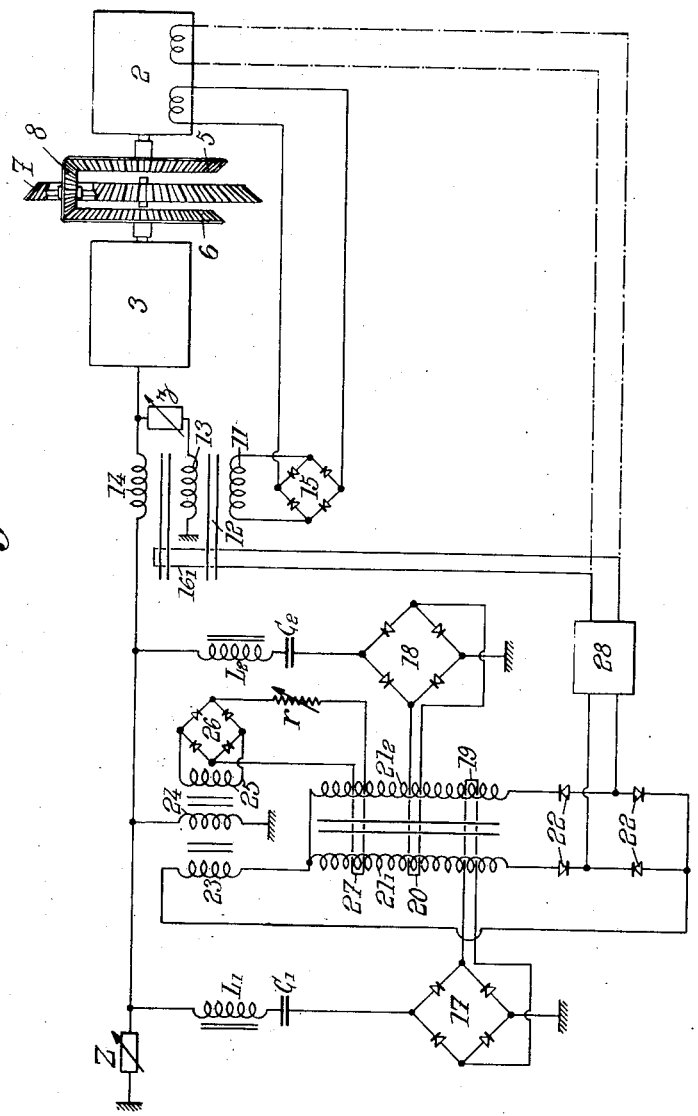
Fig. II.

United States Patent Office 2,900,594
Patented Aug. 18, 1959

2,900,594

SYSTEMS INCLUDING SLIPPING COUPLING MEANS BETWEEN A DRIVING SHAFT AND A DRIVEN SHAFT FOR GENERATORS

Pierre Etiénne Bessiere, Paris, France, assignor, by mesne assignments, to Societe Anonyme Etablissements Labinal, Paris, France, a society of the French Republic Application February 12, 1957, Serial No. 639,826

Claims priority, application France February 15, 1956

5 Claims. (Cl. 322—32)

The present invention relates to systems including slipping coupling means interposed between a driving shaft and a driven shaft, said coupling means including a differential gear one of the elements of which is subjected to the action of a braking device.

My invention is more especially concerned with the systems of this kind in which the driving shaft rotates at a substantially variable speed and the driven shaft is to rotate at a constant speed.

An interesting field of application for such systems is concerned with aviation, where it is advantageous to feed a uniform frequency to a radar or another electric apparatus mounted on an airplane, when said apparatus is to be driven by the power plant of this airplane. For instance, in this case, the driving shaft of the system is constituted by the shaft of a turbine belonging to the jet power plant of the aircraft and the driven shaft is that of a constant frequency alternator.

The systems of this kind which have been made up to the present time are complicated and heavy. They occupy a lot of space and their efficiency is relatively low.

One of the objects of the present invention is to provide a simple, light and easily adjustable system of this kind.

For this purpose, the three input and output main elements of a differential gear (that is to say the planet-wheel carrier and the two sun-wheels are coupled respectively with the driving machine running at variable speed, with the braking machine and with the machine to be driven at constant speed.

According to my invention, the braking machine is an eddy current brake capable of supplying, for a given excitation, a torque which remains constant for speeds varying within a very large range, for instance from 500 to 8000 revolutions per minute.

The advantages resulting from the use of such a brake will now be stated.

The machine to be driven must rotate at constant speed.

If the load of this machine does not vary, that is to say if this machine requires for its drive a uniform torque, it is necessary to have a constant braking torque despite variations of speed of the brake caused by variations in the speed of rotation of the driving machine, the speed of the machine to be driven being intended to remain constant. Now an eddy current brake complies with this condition without modification of its excitation.

But if the load of the machine to be driven varies, i.e. if the torque required for driving it varies, it is necessary and it suffices to have the torque created by the brake modified in the same ratio, which is obtained by varying the excitation current of this brake.

When the ratio of the torque transmitted to the machine to be driven to the torque created by the brake has been restored to its initial value, which depends only upon the characteristics of the differential gear and which may be equal to 1, uniformity of the speed of the driven shaft is again achieved and the conditions are equivalent to those already considered where the load of the machine to be driven does not vary, with only a difference in the brake excitation current.

Therefore it suffices to have the brake excitation current controlled in a suitable manner in accordance with variations of the load of the machine to be driven to obtain a correct regulation of the whole, whatever be the variations of said load.

It is possible to obtain such a brake excitation current, in particular when the machine that is driven is an alternator, by making use of a mere frequency regulator, which would for instance be constituted by a frequency discriminator feeding a series of magnetic amplifiers.

A preferred solution according to my invention consists in making use of two complementary means, of light weight and occupying little volume, one serving to comply roughly with the above stated conditions and the other serving to finish the regulation.

The first means consists for instance in a composite tranformer having two primaries one of which is fed with the voltage and the other with the current of the alternator and the secondary of which supplies a current substantially proportional to the power delivered by this alternator, which current is capable of exciting a winding of the brake.

The second means is for instance a regulator as above but much lighter and of much smaller volume, because it must be sensitive only to relatively small frequency variations. Such a regulator device supplies a current capable of acting upon the saturation of the composite transformer, or directly upon an auxiliary winding of the brake.

Preferred embodiments of my invention will be hereinafter described with reference to the accompanying drawings, given merely by way of example and in which:

Fig. 1 diagrammatically shows the coupling system according to my invention.

Figs. 2 to 6 inclusive diagrammatically show various kinds of differential gears which may be used according to my invention.

Figs. 7 and 8 show, in axial section, two eddy current brake machines which may be used according to my invention.

Fig. 9 shows the lay-out of a coupling system made according to my invention.

Fig. 10 illustrates the principle of regulation.

Fig. 11 is a more detailed view of the elements constituting such a regulating system.

On Fig. 1, the driving machine is designated by reference numeral 1, the braking machine by 2, the machine to be driven by 3 and the differential gear by 4.

Of course, the arrangement of elements 1, 2 and 3 around differential gear 4 as shown by Fig. 1 is not in any way limitative.

In particular, all these elements might be mounted in line, that is to say all the shafts would be parallel or even coaxial, so as to reduce the transverse dimensions of the system.

The driving machine might be coupled with the corresponding element of the differential gear through two or more coupling means having different transmission ratios, which may be interesting for instance if the speed of the driving machine varies within a very large range during the starting period and only within a limited range during normal running conditions.

On Figs. 2 to 6, which show some types of differential gears adapted to be used in connection with my invention, reference numerals 5 and 6 designate the sunwheels and 7 the planet-wheel carrier. The gear wheels are advantageously of the spur gear type.

In order to obtain high rotational speeds, the planet-wheels 8 are advantageously mounted on ball bearings.

Figs. 7 and 8 show two different types of eddy current braking machines cooled down by means of air and the rotors of which are designated by 9 while the stators are designated by 10.

An eddy current brake complying with the above stated conditions concerning the torque that is developed, includes as armature a non-laminated mass constituted, at least mostly, by a ferrous material and preferably iron or mild steel.

The eddy currents (or Foucault currents) are formed in the armature, which is generally the rotor 9 of the brake machine.

In order to achieve a more constant couple by means of such a braking machine for very large variations of the speed of rotation of its rotor, it may be advantageous in some cases to add, to the ferrous mass, elements of a metal which is a good conductor of electricity (copper, aluminum, etc.) which may constitute up to 10% by weight of said mass.

Such elements may for instance be constituted by rings $9_1$, as shown in dotted lines on Fig. 7, or other closed circuits.

They may be secured to mass 9 by electrolysis or any other means.

In order to improve or to replace the cooling of the brake by means of air, I may if necessary make use of the lubricating oil circuit of the differential gear to cool down the brake.

The brake regulation system which will now be described applies in particular to the case where the machine to be driven is an alternator for which it is desired to obtain a constant frequency but the load of which is variable. The braking machine is an eddy current brake and the driving machine is a variable speed engine, in particular an aircraft engine, whether it is the main engine of said aircraft or an auxiliary engine mounted thereon.

Regulation, according to a preferred embodiment of my invention, is obtained in two steps, to wit:

A rough regulation which consists in exciting the electric brake by means of a current which is substantially proportional to the power supplied by the alternator, as it will be hereinafter explained, And a finishing step in order to adjust the regulation exactly to the desired value, by making use of suitable means such as a magnetic amplifier sensitive to a frequency discriminator fed with current from the alternator.

For the sake of clarity, in the following description the alternator is supposed to be a single phase alternator, but of course a polyphase alternator may be used according to my invention.

The excitation current $i$ considered in the first step of the regulation may determine the braking torque, which depends exclusively thereon since the brake is designed in such manner that its torque remains constant for variations of speed within a very large range (for instance from 500 to 8000 revolutions per minute) when the excitation intensity remains unchanged. (Said torque is substantially proportional to the square of this intensity.)

Said current $i$ is supplied by the secondary 11 (Fig. 9) of a transformer the iron core 12 of which may be saturated or not, one primary winding 13 of said transformer being supplied with the voltage U of the alternator through, if necessary, an impedance $z$, the other primary winding 14 being supplied with the current I thereof, which may be fed to the load impedance Z (radar, etc.) variable in magnitude and in phase difference.

As a first approximation it is desired to obtain in secondary 11 a current $i$ proportional to the active power supplied by the alternator, which power is equal to the product $U.I \cos \varphi$ where $\cos \varphi$ is the power factor) since, for a given speed, the torque of an alternator depends only upon this active power and it is desired to obtain on the differential gear a constant ratio of this torque to the braking torque which is in fact determined by said current $i$.

The compound transformer that is used in this case supplies an interesting solution concerning this point, since the excitation current $i$ it produces is proportional to the ampere-turns of the secondary which are, with a very close approximation, equal in absolute value to the geometrical sum of those of the two primary windings. In other words, current $i$ is proportional to the geometrical sum of the vectors $\vec{U}$ and $\vec{I}$ making with each other an angle equal to $\varphi$ if the impedance $z$ is purely ohmic in nature, and otherwise equal to $\varphi$ plus a constant.

It will be seen that this sum varies in the same manner as the product $U.I. \cos \varphi$ and that, in first approximation, it may be considered as equal thereto within a small range of variations of $\cos \varphi$ (for instance for $\cos \varphi$ ranging from 0.75 to 1) if the values of the various parameters are suitably chosen.

Thus, if it is supposed that the voltage U is regulated, winding 13 and impedance $z$ are preferably calculated so that the secondary supplies, when the alternator is working on no load $(I=0)$, an excitation current $i_0$, which depends upon voltage U, such that the braking torque resulting therefrom is equal to the driving torque of alternator on no load.

In particular, winding 14 is calculated so that, when the nominal current $I_n$ of the alternator flows therethrough, it produces in the secondary an excitation current $i_n$ which, geometrically added to $i_0$, produces a braking torque equal to the driving torque of the alternator under load $I_n$, whether $\cos \varphi$ is equal to 1 or to 0.75 for instance.

On Fig. 10, I have shown the relative geometrical positions of the various vectors $i$:

$i_0$ is represented by OA if $z$ is purely ohmic; if $z$ were not ohmic but for instance purely of self inductance nature, $i_0$ would be represented by OA' (with a suitable direction of winding).

AB represents the excitation current supplied by winding 14 and proportional to I, for $\cos \varphi = 1$.

AC represents the same current for $\cos \varphi = 0.75$.

AB' and AC' represent the vectors AB and AC corresponding to a load $I_n$ of the alternator.

Therefore one reads at OB and at OC the values of the excitation current of the braking machine corresponding to a voltage U, to an intensity I and, respectively, to $\cos \varphi$ equal to 1 and 0.75. Segment CD shows the reduction of intensity of this current due to a reduction of $\cos \varphi$ for a constant value of I, and CE that due to a reduction of intensity I for the same value of $\cos \varphi$.

The electric brake is excited by current supplied by secondary 11, in particular after its rectification in a diode bridge 15.

It is therefore possible, by means of this compound transformer (11, 12, 13, 14) to create an excitation of the brake which depends upon the active power of the alternator and such that the braking torque and the alternator driving torque are roughly equal, independently of any regulator device.

Therefore the function of such a frequency regulator working in the second step of the process is only a finishing function. The range of its action is therefore very narrow. Its accuracy is consequently greatly increased, its risks of oscillation greatly reduced and its construction is simplified, which constitutes a particularly interesting feature in aeronautic construction.

Such a frequency regulator 16 is made to act either upon the saturation of the compound transformer, by means of a winding $16_1$ which surrounds its magnetic core, or directly upon the electric brake by means of a supplementary excitation winding thereof.

I will now describe a frequency regulator construction which is particularly well adapted for use in the present case, this example having however no limitative character.

This amplifier is a magnetic amplifier sensitive to the action of a frequency discriminator.

This last mentioned apparatus includes for instance two series mounted oscillating circuits ($L_1$, $C_1$ and $L_2$ and $C_2$) (Fig. 11) tuned to frequencies $f_1$, $f_2$ very close to and located on either side of the frequency to be controlled, fed by the alternator current and supplying, through diode bridges 17 and 18, two windings 19 and 20 in opposition which adjust the saturation of a magnetic amplifier.

The coils $21_1$ and $21_2$ of this amplifier are fed through a diode bridge 22 from the secondary 23 of a transformer the primary 24 of which is supplied with current from the alternator.

A third winding 25 of this transformer creates, through a diode bridge 26 and an adjustment resistor $r$, a bias current in the winding 27 of the magnetic amplifier.

The magnetic permeability of this amplifier is therefore controlled by the geometic sum of the ampere-turns of the three windings 19, 20 and 27. When the frequency of the alternator is equal to the desired frequency, the geometric sum of the ampere-turns of the two first elements is zero and the effect of the regulator upon the electric brake is constant and well determined. But when said frequency is different from the desired value, this sum assumes a value having a sign such that the braking effect that results therefrom tends to eliminate this difference.

I might of course provide several amplifiers in series, in particular in the case (risks of oscillation, etc.) where the time of response of the regulator must be very short. Thus, as shown at 28, a second amplifier may be used.

There is further added, if necessary, a supplementary stabilizing circuit such as well known, in particular for controlling the derivative of the frequency with respect to time.

I therefore obtain a system which permits a very accurate regulation of the slipping of a torque converter including a mechanical gear box, the whole having a low weight and being of a simple and strong construction.

It should be noted that with the exception of the brushes of the alternator (if this alternator includes such brushes), the device includes no sliding contact, which is particularly advantageous at high altitude where these contacts are quickly worn.

It is possible with such a system to drive, by means of an engine having a variable speed, an alternator of constant frequency, or even from several engines the variable speeds of which may be different; it is possible to drive a system of several alternators working in parallel and for instance each coupled with one of these engines by a system such as above described.

When an alternator driven as above described is started, the driving engine being supposed to be already started, it is necessary to reduce the braking effect to such a degree that the alternator can be started electrically.

In particular I make use for this purpose:
Either of an external battery of accumulators,
Or of a fan coupled with the electric brake, which is to facilitate its cooling and creates a braking torque adapted to the driving torque of the alternator under no load,
Or again of a conventional electro-mechanic clutch (of the disc type or the iron powder type) supplied with the voltage of the alternator,
Or again of the remanence of the electric brake, which may be accentuated by means of magnet steels,
Or any other suitable means.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended with the scope of the accompanying claims.

What I claim is:

1. A system which comprises, in combination a driving shaft of substantially variable speed, a shaft to be driven at uniform speed, an alternator having its rotor fixed on said driven shaft, a differential gear including an input element and two output elements, one of said elements being coupled with said driving shaft, another of said elements being coupled with said driven shaft, a braking device coupled with the third of said elements, said braking device being constituted by an eddy current brake capable of supplying, for a given excitation, a resistant torque of constant value irrespective of variations of the speed of rotation thereof in a very large range of said speed variation, and two complementary means for adjusting the excitation of said brake in accordance with variation of the load of said driven shaft, one of said means supplying an electric term proportional to the power supplied by said alternator and the other of said means, which serves to finish regulation, supplying an electric term which is a function of the difference between the actual speed of rotation of said alternator and the desired speed thereof.

2. A system according to claim 1 in which the first mentioned means is constituted by a composite transformer having two primaries arranged one to be supplied by the voltage of said alternator and the other by the current of said alternator, the electric term that is supplied by said first mentioned means being the current delivered by the secondary of said transformer.

3. A system according to claim 1 in which the means for finishing regulation consist of a device for regulating the frequency of the alternator, the electric term that is supplied by said device being the current delivered by it.

4. A system according to claim 1 in which the means for finishing regulation consist of a device for regulating the frequency of the alternator, the electric term that is supplied by said device being the current delivered by it, said frequency regulating device including a magnetic amplifier, and a frequency discriminator fed from said alternator and connected with said frequency regulating device.

5. A system which comprises, in combination, a driving shaft of substantially variable speed, a shaft to be driven at uniform speed, a differential gear including an input element and two output elements, one of said elements being coupled with said driving shaft, another of said elements being coupled with said driven shaft, a braking device coupled with the third of said elements, said braking device being constituted by an eddy current brake capable of supplying, for a given excitation, a resistant torque of constant value irrespective of variations of the speed of rotation thereof in a very large range of said speed variation, and means for adjusting the excitation of said eddy current brake in accordance with variation of the load of said driven shaft.

References Cited in the file of this patent

UNITED STATES PATENTS

| | | |
|---|---|---|
| 1,839,096 | Haalmeijer et al. | Dec. 29, 1931 |
| 2,484,138 | Winther | Oct. 11, 1949 |